US012648018B2

(12) United States Patent
Liu et al.

(10) Patent No.: US 12,648,018 B2
(45) Date of Patent: Jun. 2, 2026

(54) UPLINK POLLING FOR NEW RADIO OPERATION IN MM-WAVE FREQUENCY BANDS

(71) Applicant: Telefonaktiebolaget LM Ericsson (publ), Stockholm (SE)

(72) Inventors: Yuhang Liu, Lund (SE); Peter Alriksson, Hörby (SE); Jung-Fu Cheng, Fremont, CA (US); Stephen Grant, Pleasanton, CA (US); Reem Karaki, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 761 days.

(21) Appl. No.: 17/925,135

(22) PCT Filed: May 17, 2021

(86) PCT No.: PCT/SE2021/050465
§ 371 (c)(1),
(2) Date: Nov. 14, 2022

(87) PCT Pub. No.: WO2021/230806
PCT Pub. Date: Nov. 18, 2021

(65) Prior Publication Data
US 2023/0189333 A1    Jun. 15, 2023

Related U.S. Application Data

(60) Provisional application No. 63/025,734, filed on May 15, 2020.

(51) Int. Cl.
*H04W 74/06*    (2009.01)
*H04B 7/06*    (2006.01)
*H04W 72/21*    (2023.01)

(52) U.S. Cl.
CPC .......... *H04W 74/06* (2013.01); *H04B 7/0617* (2013.01); *H04W 72/21* (2023.01)

(58) Field of Classification Search
CPC ..... H04W 74/06; H04W 72/21; H04B 7/0617
See application file for complete search history.

(56) References Cited

U.S. PATENT DOCUMENTS

2010/0034095 A1    2/2010  Ho et al.
2011/0080881 A1*   4/2011  Hsu ..................... H04W 52/365
                                                        370/329

(Continued)

FOREIGN PATENT DOCUMENTS

AU      2018340729 B2    4/2019
EP         3528575 A1    8/2019
WO      2019109478 A1    6/2019

OTHER PUBLICATIONS

Extended European Search Report dated May 23, 2024 issued in corresponding European Patent Application No. 21804551.6, consisting of 10 pages.

(Continued)

*Primary Examiner* — Redentor Pasia
(74) *Attorney, Agent, or Firm* — Weisberg I.P. Law, P.A.

(57) ABSTRACT

A method, system and apparatus are disclosed for uplink polling for, e.g., New Radio (NR) in millimeter wave (mm-Wave) frequency bands. In one embodiment, a network node is configured to transmit a polling request, the polling request indicating a request for a wireless device's uplink buffer status; and as a result of the polling request, receive a polling response. In another embodiment, a wireless device (WD) is configured to receive a polling request, the polling request indicating a request for the WD's uplink buffer status; and as a result of the polling request, determine the WD's uplink buffer status.

19 Claims, 14 Drawing Sheets

(56) References Cited

U.S. PATENT DOCUMENTS

| | | | | |
|---|---|---|---|---|
| 2016/0366254 A1* | 12/2016 | Asterjadhi | ............ | H04L 5/0053 |
| 2018/0191422 A1 | 7/2018 | Xia et al. | | |
| 2018/0227771 A1 | 8/2018 | Malik et al. | | |
| 2019/0104549 A1* | 4/2019 | Deng | ................ | H04W 72/0453 |
| 2020/0059959 A1 | 2/2020 | Turtinen et al. | | |
| 2020/0107219 A1 | 4/2020 | Jang et al. | | |
| 2021/0135928 A1 | 5/2021 | Yi et al. | | |
| 2021/0152230 A1* | 5/2021 | Josan | ...................... | H04L 5/001 |
| 2021/0234579 A1* | 7/2021 | Han | ...................... | H04B 7/0689 |
| 2021/0274545 A1* | 9/2021 | Adjakple | .............. | H04W 72/21 |
| 2021/0360642 A1* | 11/2021 | Abedini | ................ | H04W 24/10 |
| 2021/0360646 A1* | 11/2021 | Chu | .................... | H04W 72/569 |
| 2021/0377786 A1* | 12/2021 | Lee | ....................... | H04W 72/23 |
| 2022/0007215 A1* | 1/2022 | Zhang | .................. | H04L 5/0091 |

OTHER PUBLICATIONS

3GPP TSG RAN WG1 #98bis; R1-1910916; Source: Nokia, Nokia Shanghai Bell; Title: Enhancements on Multi-beam Operation; Agenda Item: 7.2.8.3; Document for: Discussion and Decision; Chongqing, China, Oct. 14-20, 2019, consisting of 10 pages.
International Search Report and Written Opinion dated Jun. 9, 2021 for International Application No. PCT/SE2021/050465 filed on May 17, 2021, consisting of 11 pages.

3GPP TSG-RAN WG1 Meeting #101-e R1-2003289; Title: Potential UE complexity reduction features for Redcap; Source: Ericsson; Agenda Item: 8.3.1; Document for: Discussion and Decision; Date and Location : May 25-Jun. 5, 2020, e-Meeting, consisting of 33 pages.
3GPP TS 38.213 V16.2.0; 3rd Generation Partnership Project; Technical Specification Group Radio Access Network; NR; Physical layer procedures for control (Release 16), Jun. 2020, consisting of 176 pages.
3GPP TS 38.211 V16.2.0; 3rd Generation Partnership Project; Technical Specification Group Radio Access Network; NR; Physical channels and modulation (Release 16), Jun. 2020, consisting of 131 pages.
3GPP TSG RAN Meeting #86 RP-193259 (revision of RP-193258; Title: New SID: Study on supporting NR from 52.6GHz to 71 GHz; Source: Intel Corporation; Agenda Item: 9.1.1; Document for: Approval; Date and Location: Dec. 9-12, 2019, Sitges, Spain. consisting of 3 pages.
3GPP TS 38.321 V15.8.0; 3rd Generation Partnership Project; Technical Specification Group Radio Access Network; NR; Medium Access Control (MAC) protocol specification (Release 15), Dec. 2019, consisting of 78 pages.
3GPP TS 38.212 V16.2.0; 3rd Generation Partnership Project; Technical Specification Group Radio Access Network; NR; Multiplexing and channel coding (Release 16), Jun. 2020, consisting of 151 pages.

* cited by examiner

| R | Serving Cell ID | BWP ID | Oct 1 |
|---|---|---|---|
| R | PUCCH Resource ID | | Oct 2 |
| R | R | Spatial Relation Info ID | Oct 3 |

...

| R | PUCCH Resource ID | | Oct 2N-2 |
| R | R | Spatial Relation Info ID | Oct 2N-1 |

FIG. 2

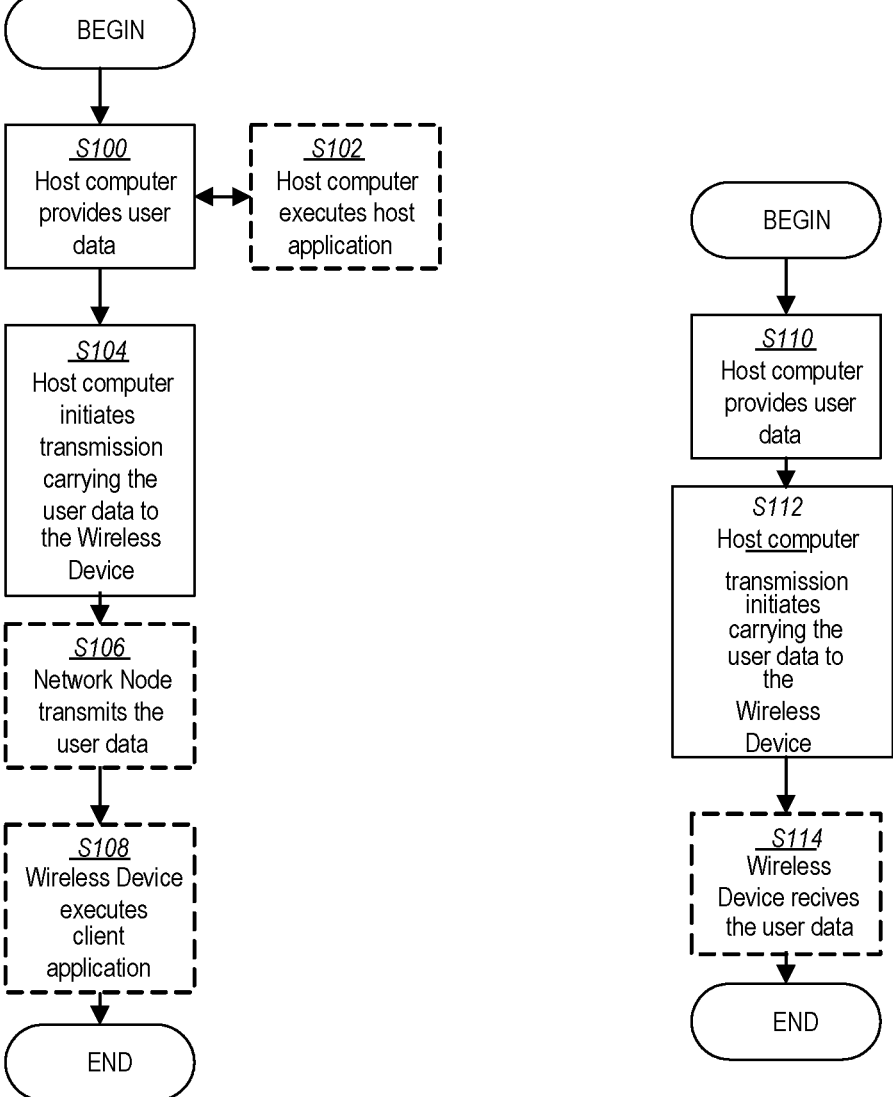
FIG. 5                    FIG. 6

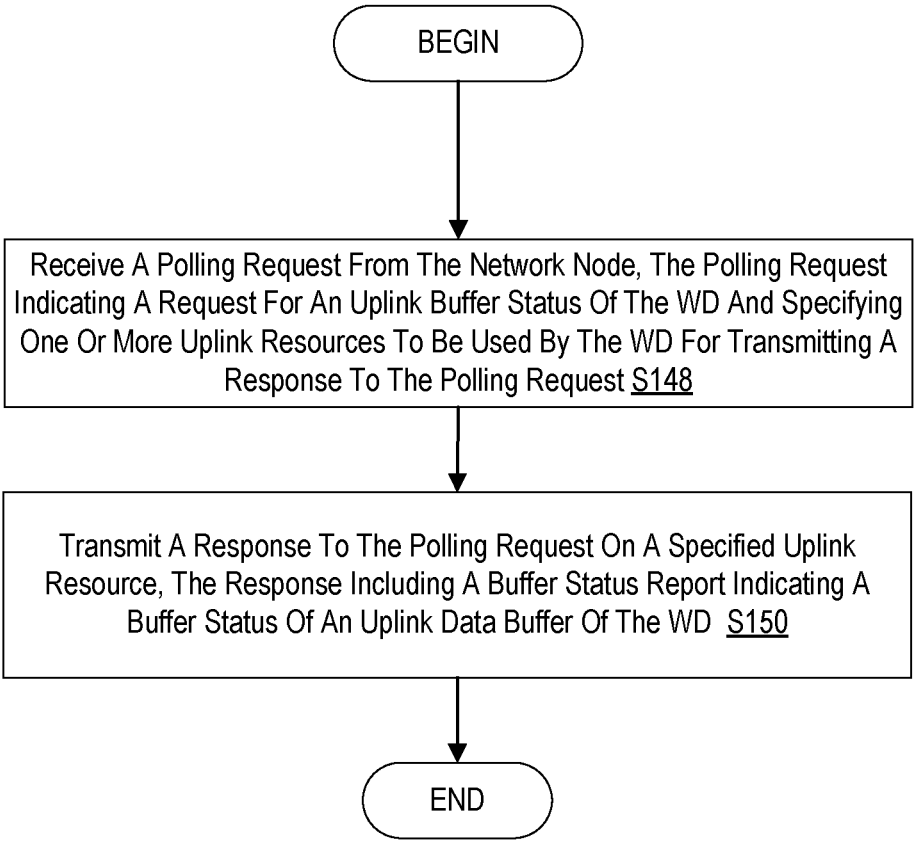

BEGIN

Receive A Polling Request From The Network Node, The Polling Request Indicating A Request For An Uplink Buffer Status Of The WD And Specifying One Or More Uplink Resources To Be Used By The WD For Transmitting A Response To The Polling Request <u>S148</u>

Transmit A Response To The Polling Request On A Specified Uplink Resource, The Response Including A Buffer Status Report Indicating A Buffer Status Of An Uplink Data Buffer Of The WD <u>S150</u>

END

FIG. 12

UPLINK POLLING FOR NEW RADIO OPERATION IN MM-WAVE FREQUENCY BANDS

CROSS-REFERENCE TO RELATED APPLICATIONS

This application is a Submission Under 35 U.S.C. § 371 for U.S. National Stage Patent Application of International Application No.: PCT/SE2021/050465, filed May 17, 2021 entitled "UPLINK POLLING FOR NEW RADIO OPERATION IN MM-WAVE FREQUENCY BANDS," which claims priority to U.S. Provisional Application No. 63/025,734, filed May 15, 2020, entitled "UL POLLING FOR NR OPERATION IN MM-WAVE FREQUENCY BANDS," the entireties of both of which are incorporated herein by reference.

TECHNICAL FIELD

The present disclosure relates to wireless communications, and in particular, to uplink polling.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

NR Operation in mm-Wave Bands

Mobile broadband may continue to drive the demands for higher overall traffic capacity and higher achievable end-user data rates in the wireless access network. Several scenarios in the future may require data rates of up to 10 Gigabits per second (Gbps) in local areas. These demands for very high system capacity and very high end-user date rates can be met by networks with distances between access nodes ranging from a few meters in indoor deployments up to roughly 50 meters (m) in outdoor deployments, i.e., with an infra-structure density considerably higher than the densest networks of today. The wide transmission bandwidths needed to provide data rates up to 10 Gbps and above can likely only be obtained from spectrum allocations in the millimeter-wave band (mm-Wave band). High-gain beam-forming, typically realized with array antennas, can be used to mitigate the increased pathloss at higher frequencies. Such networks may be referred to as Third Generation Partnership Project (3GPP) New Radio (NR), also called 5G systems herein.

NR supports a diverse set of use cases and a diverse set of deployment scenarios. The later includes deployment at both low frequencies (100 s of MHz), and very high frequencies (mm waves in the tens of GHz). Two operation frequency ranges are defined in NR Release 15 (Rel-15): frequency 1 (FR1) from 410 MHz to 7125 MHz and frequency 2 (FR2) from 24.250 GHz to 52.6 GHz. 3GPP Radio Access Network (RAN) is currently working on a study item (SI) for NR Release 17 (Rel-17) to support NR operation from 52.6 GHz to 71 GHz, which includes at least the following considerations:

Study of changes to NR using existing downlink/uplink (DL/UL) NR waveform to support operation between 52.6 Giga Hertz (GHz) and 71 GHz;

Study of applicable numerology including subcarrier spacing, channel bandwidth (BW) (including maximum BW), and their impact to FR2 physical layer design to support system functionality considering practical RF impairments;

Identify potential critical problems to physical signal/channels, if any;

Study of channel access mechanism, considering potential interference to/from other nodes, assuming beam-based operation, in order to comply with the regulatory requirements applicable to unlicensed spectrum for frequencies between 52.6 GHz and 71 GHz;

Note: It is noted that potential interference impact, if identified, may require interference mitigation solutions as part of channel access mechanism.

NR Frame Structure

Similar to 3GPP Long Term Evolution (LTE), NR uses OFDM (Orthogonal Frequency Division Multiplexing) in the downlink (i.e., from a network node, gNB, eNB, or base station, to a wireless device, such as user equipment or UE). The basic NR physical resource over an antenna port can thus be seen as a time-frequency grid as illustrated in for example FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f = (15 \times 2^{\mu})$ kHz where $\mu \in (0, 1, 2, 3, 4)$. $\Delta f = 15$ kHz is the basic (or reference) subcarrier spacing that is also used in LTE.

In the time domain, downlink (DL) and uplink (UL) transmissions in NR may be organized into equally-sized subframes of 1 millisecond (ms) each similar to LTE. A subframe may be further divided into multiple slots of equal duration. The slot length for subcarrier spacing $\Delta f = (15 \times 2^{\mu})$ kHz is $1/2^{\mu}$ ms. There is only one slot per subframe for $\Delta f = 15$ kHz and a slot includes 14 OFDM symbols.

Downlink transmissions may be dynamically scheduled, i.e., in each slot the network node (e.g., gNB) transmits downlink control information (DCI) about which WD data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A WD first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including (but not limited to) synchronization signal block (SSB), channel state information reference signal (CSI-RS), etc.

Uplink data transmissions, carried on Physical Uplink Shared Channel (PUSCH), can also be dynamically scheduled by the network node, e.g., gNB, by transmitting a DCI., the DCI (which is transmitted in the DL region) always indicates a scheduling time offset so that the PUSCH is transmitted in a slot in the UL region.

Scheduling Request Transmission in NR

In NR, the Scheduling Request (SR) is used for requesting UL-SCH resources for new transmission. A WD in radio resource control (RRC) connected mode may be configured with zero, one, or more SR configurations, with each SR configuration corresponding to one or multiple logical channels. An SR configuration includes a set of PUCCH resources for SR across different bandwidth parts (BWPs) and cells, also referred as SR resources in the standard. There may be at most one SR resource assigned to an SR configuration in a BWP in a serving cell. An SR resource configuration includes an SR periodicity and time offset parameter (periodicityAndOffset) and a PUCCH resource identifier (ID). The SR periodicity and time offset parameter specifies the SR transmission occasions in time domain, and the PUCCH resource ID indicates which one of the PUCCH resources in the PUCCH configuration should be used for SR transmission.

Spatial Relations for PUCCH

3GPP Rel-15 NR introduced the concept of PUCCH-SpatialRelationInfofor PUCCH transmissions, which is used to inform the WD how to tune its transmitter antenna array. For PUCCH, the WD is configured with PUCCH-Spatial-RelationInfo relations to another signals. The other signals can either be a synchronization signal/physical broadcast channel (SS/PBCH) block, a CSI-RS or a sounding reference signal (SRS), as defined for example in 3GPP Technical Specification (TS) 38.213:

If PUCCH-SpatialRelationInfo provides ssb-Index, the WD transmits the PUCCH using a same spatial domain filter as for a reception of a SS/PBCH block with index provided by ssb-Index for a same serving cell or, if servingCellId is provided, for a serving cell indicated by servingCellId;

else if PUCCH-SpatialRelationInfo provides csi-RS-Index, the WD transmits the PUCCH using a same spatial domain filter as for a reception of a CSI-RS with resource index provided by csi-RS-Index for a same serving cell or, if servingCellId is provided, for a serving cell indicated by servingCellId;

else PUCCH-SpatialRelationInfo provides srs, the WD transmits the PUCCH using a same spatial domain filter as for a transmission of a SRS with resource index provided by resource for a same serving cell and/or active UL BWP or, if servingCellId and/or uplinkBWP are provided, for a serving cell indicated by serving-CellId and/or for an UL BWP indicated by uplinkBWP.

After configuring the WD with a list of spatial relations, the gNB activates one of them using a medium access control (MAC) control element (MAC CE). The update may typically come as a response to the WD reporting a stronger received power for another reference signal than the one the current spatial relation is associated with. Thus, as the WD moves around in the cell, the WD provides a CSI report to the gNB, based on which the gNB will update the currently active spatial relation.

In 3GPP Release 16 (Rel-16), an Enhanced PUCCH Spatial Relation Activation/Deactivation MAC CE was introduced, which allows the gNB to update spatial relations for multiple PUCCH resources. Correspondingly, the space of Spatial Relation Information ID is extended from 8 to 64. FIG. 2 shows an example of Enhanced PUCCH spatial relation Activation/Deactivation MAC CE.

Buffer Status Reporting Procedure in NR

In NR, the Buffer Status reporting (BSR) procedure is used to provide the serving gNB with information about UL data volume in the MAC entity. This information is provided to scheduler in the gNB in a PUSCH transmission in the form of a BSR MAC-Control Element. The reporting may be performed per logical channel group (LCG). A BSR MAC-CE includes a LCG ID or a bitmap for all 8 LCGs, and buffer size(s) for the LCG(s) indicated by the LCG ID or bitmap. The buffer size field identifies the total amount of data available in bytes for the corresponding LCG. The buffer size field can be either 5 or 8 bits, depending on the BSR MAC-CE format, respectively referencing to two BSR buffer size tables.

There are a few buffer status report (BSR) types defined in the NR specification based on trigger condition. Regular BSR is triggered at arrival of new data from a LCG with higher priority than currently in the transmission data buffer, which might have an impact on the current data scheduling strategy; periodic BSR is triggered by expiry of the period-icBSR-Timer; and padding BSR is triggered if the amount of padding bits in a MAC protocol data unit (PDU) is sufficient for a BSR, wherein a Padding BSR can be inserted to replace some of the padding bits and shipped to the gNB "for free".

Beam Forming Centric Transmission for NR Operation in Mm-Wave Frequency

As the operating frequency of wireless networks increases and moves to millimeter wave territory, data transmission between nodes suffers from high propagation loss, which is proportional to the square of the carrier frequency. Moreover, millimeter wave signals also suffer from high oxygen absorption, high penetration loss and a variety of blockage problems. On the other hand, with the wavelength as small as less than a centimeter in some cases, it becomes possible to pack a large amount (tens, hundreds or even thousands) of antenna elements into a single antenna array with a compact formfactor, which can be widely adopted in network equipment and user devices. Such antenna arrays/panels can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands.

SUMMARY

Some embodiments advantageously provide methods, systems, and apparatuses for uplink polling for 3GPP NR in millimeter wave (mm-Wave) frequency bands.

In one embodiment, a network node is configured to transmit a polling request, the polling request indicating a request for a wireless device's uplink buffer status; and as a result of the polling request, receive a polling response.

In another embodiment, a wireless device (WD) is configured to receive a polling request, the polling request indicating a request for the WD's uplink buffer status; and as a result of the polling request, determine the WD's uplink buffer status.

According to one aspect, a network node configured to communicate with a wireless device, WD is provided. The network node includes a radio interface configured to: transmit one or more polling requests to the WD, a polling request indicating a request for an uplink buffer status of the WD and specifying uplink resources to be used by the WD for transmitting a response to the polling request; and receive respective responses to the one or more polling requests from the WD on the uplink resources specified in the polling request, a response to a polling request including an indication of an availability of a data in an uplink buffer of the WD. The network node also includes processing circuitry in communication with the radio interface, the processing circuitry configured to transmit the one or more polling requests to the WD and receive the respective responses from the WD using a same beam forming filter.

According to this aspect, in some embodiments, the one or more polling requests are transmitted one of periodically, dynamically and aperiodically. In some embodiments, a polling request is transmitted on a PUSCH and is configured to include a physical uplink control channel, PUCCH, resource indicator that points to a previously configured PUCCH resource. In some embodiments, a polling request is configured to indicate a time for physical uplink control channel, PUCCH, transmission with reference to a time of transmission of the polling request. In some embodiments, a polling request includes a spatial relation indicator indicating which one of a plurality of a plurality of spatial relations to be used by the WD for transmitting a response to the polling request. In some embodiments, a polling request is bundled with a medium access control, MAC, control element, CE, message that indicates a physical uplink control channel spatial relation. In some embodiments, the one or more polling requests are simultaneously transmitted to a plurality of WDs within the tuned beam, the simultaneously transmitted polling requests being transmitted by a group common downlink control information, DCI, message. In some embodiments, transmitting the one or more polling requests is coordinated with a wake-up time of the WD. In some embodiments, a slot format indicator, SFI, is used as a polling request. In some embodiments, a polling request transmitted by the network node is configured to trigger the WD to transmit a response to the polling request on OFDM symbols configured as "flexible". In some embodiments of this aspect, the processing circuitry is further configured to tune a beam on which the network node receives the polling responses to drive a power of the responses to the polling requests to ensure reception of the respective polling responses. In some embodiments, the polling request is transmitted on a physical uplink shared channel, PUSCH.

According to another aspect, a method in a network node configured to communicate with a wireless device, WD is provided. The method includes transmitting one or more polling requests to the WD, a polling request indicating a request for an uplink buffer status of the WD and specifying uplink resources to be used by the WD for transmitting a response to the polling request. The method also includes receiving respective responses to the one or more polling requests from the WD on the uplink resources specified in the polling request, a response to a polling request including an indication of an availability of a data in an uplink buffer of the WD. The method also includes transmitting the one or more polling requests to the WD and receive the respective responses from the WD using a same beam forming filter.

According to this aspect, in some embodiments, the one or more polling requests are transmitted one of periodically, dynamically and aperiodically. In some embodiments, a polling request is configured to include a physical uplink control channel, PUCCH, resource indicator that points to a previously configured PUCCH resource. In some embodiments, a polling request is transmitted on a PUSCH and is configured to indicate a time for physical uplink control channel, PUCCH, transmission with reference to a time of transmission of the polling request. In some embodiments, a polling request includes a spatial relation indicator indicating which one of a plurality of a plurality of spatial relations to be used by the WD for transmitting a response to the polling request. In some embodiments, a polling request is bundled with a medium access control, MAC, control element, CE, message that indicates a physical uplink control channel spatial relation. In some embodiments, the one or more polling requests are simultaneously transmitted to a plurality of WDs within the tuned beam, the simultaneously transmitted polling requests being transmitted by a group common downlink control information, DCI, message. In some embodiments, transmitting the one or more polling requests is coordinated with a wake-up time of the WD. In some embodiments, a slot format indicator, SFI, is used as a polling request. In some embodiments, a polling request transmitted by the network node is configured to trigger the WD to transmit a response to the polling request on OFDM symbols configured as "flexible". In some embodiments of this aspect, the method further includes tuning a beam on which the network node receives the polling responses to drive a power of the responses to the polling requests to ensure reception of the respective polling responses. In some embodiments, the polling request is transmitted on a physical uplink shared channel, PUSCH.

According to yet another aspect, a WD configured to communicate with a network node is provided. The WD includes an uplink data buffer and a radio interface. The radio interface is configured to receive a polling request from the network node, the polling request indicating a request for an uplink buffer status of the WD and specifying one or more uplink resources to be used by the WD for transmitting a response to the polling request. The radio interface is further configured to transmit a response to the polling request on a specified uplink resource, the response including a buffer status report indicating a buffer status of the uplink data buffer.

According to this aspect, in some embodiments, transmitting a response is conditioned at least in part on the uplink data buffer being not empty. In some embodiments, the buffer status is indicated by one-bit. In some embodiments, the buffer status report indicates a volume of data in the uplink data buffer. In some embodiments, the WD further includes a timer configured to time a period of waiting for a next polling request. In some embodiments, the timer is stopped when there is no data in the uplink data buffer. In some embodiments of this aspect, the polling request is received on a physical uplink shared channel, PUSCH. In some embodiments, the received polling request is ignored when the WD has an empty uplink data buffer.

According to another aspect, a method in a wireless device, WD, configured to communicate with a network node is provided. The method includes receiving a polling request from the network node, the polling request indicating a request for an uplink buffer status of the WD and specifying one or more uplink resources to be used by the WD for transmitting a response to the polling request, and transmitting a response to the polling request on a specified uplink resource, the response including a buffer status report indicating a buffer status of an uplink data buffer of the WD.

According to this aspect, in some embodiments, transmitting a response is conditioned at least in part on the uplink data buffer being not empty. In some embodiments, the buffer status is indicated by one-bit. In some embodiments, the buffer status report indicates a volume of data in the uplink data buffer. In some embodiments, a timer is configured to time a period of waiting for a next polling request. In some embodiments, the timer is stopped when there is no data in the uplink data buffer. In some embodiments of this aspect, the method further includes receiving the polling request on a physical uplink shared channel, PUSCH. In some embodiments, the method further includes ignoring the received polling request when the WD has an empty uplink data buffer.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 illustrates an example Enhanced PUCCH spatial relation Activation/Deactivation MAC CE;

FIG. 5 is a flowchart illustrating example methods implemented in a communication system including a host computer, a network node and a wireless device for executing a client application at a wireless device according to some embodiments of the present disclosure;

FIG. 6 is a flowchart illustrating example methods implemented in a communication system including a host computer, a network node and a wireless device for receiving user data at a wireless device according to some embodiments of the present disclosure;

FIG. 12 is a flowchart of another example process in a WD according to principles set forth herein;

DETAILED DESCRIPTION

Figure 1:
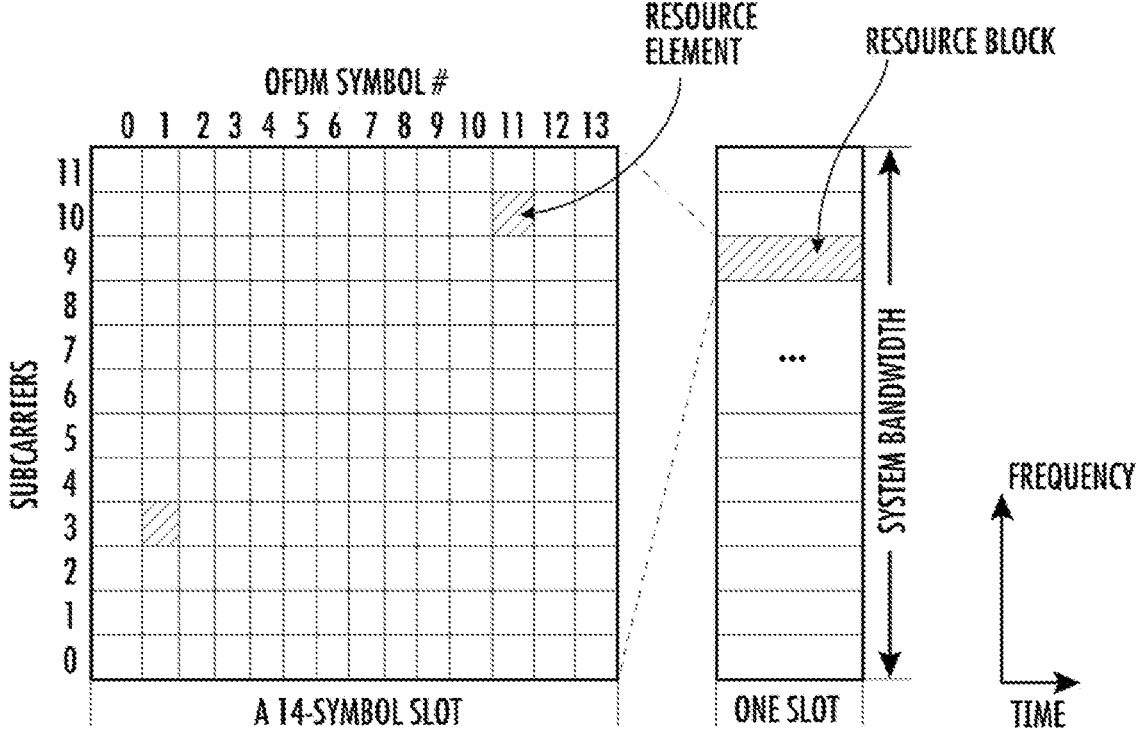
FIG. 1 illustrates an example NR physical resource grid.

Generally, NR operation in mm-wave bands heavily relies on beamforming for both transmission and reception. For UL transmission, a spatial relation should be established and understood by both the WD and the network node (e.g., gNB) before transmission in the UL is conducted. A spatial relation is defined between an UL channel/reference signal (PUSCH, PUCCH, SRS) and either a DL reference signal (CSI-RS, SS/PBCH block) or another UL reference signal (SRS). If the UL channel/signal A is spatially related to reference signal B, it may generally mean that the WD should beamform A in the same way as it received/transmitted B.

By establishing a spatial relation, the WD gets to know in which direction to beamform its transmission signal towards the targeted network node (e.g., gNB), and the network node (e.g., gNB) also understands how to tune its receiver (RX) beam towards the WD. A number of issues are identified below regarding UL beamforming in the scenario of periodic Scheduling Request (SR) transmission on PUCCH.

Firstly, in a periodic SR transmission scenario where a transmission is initiated by a WD, the network node (e.g., gNB) may not know from which direction the WD will transmit, hence the network node might not be able to tune its RX beam properly towards the WD. Because of this beam mis-alignment, the WD may need to re-transmit the SR many times before it is finally 'heard' by the network node (e.g., gNB). There is also a considerable risk that the WD might reach the limit of SR transmission attempts; thus, falling back to transmit SR over the random access channel (RACH). As a consequence of this beam mis-alignment phenomenon, SR and the overall UL data transmission latency can be very high.

Secondly, the network node (e.g., gNB) with analog beamforming capability can only listen to UL transmission in one direction (per antenna panel) at a time. To solve this, the network node (e.g., gNB) may periodically sweep through all beams in the cell for SR detection in SR transmission occasions. In such an application scenario, SR latency may not only be determined by the SR periodicity configured to the WDs, but also by the periodicity of the SR sweeping in the network node (e.g., gNB). Imagine in a cell where a large number of narrow beams are configured, it will take many slots for the network node (e.g., gNB) to beam-sweep through the entire cell for SR detection. Statistically, the SR latency can become extremely high. This can be a big issue for some devices or applications with a tight latency requirement.

Thirdly, SR resources for multiple WDs may be configured in same OFDM symbol(s) by means of frequency or code multiplexing to improve resource efficiency. The network node (e.g., gNB) with analog beamforming capability may multiplex SR resources in the same time occasion only for WDs located in the same beam coverage area, so that the network node (e.g., gNB) can detect the SR transmissions from the WDs with the same RX beam. When the WDs are moving around in the cell across different beam coverage area, the network node (e.g., gNB) needs to frequently re-configure SR resources for the WDs by dedicated RRC signaling, which can contribute to an excessive signaling overhead to the system.

Some embodiments of the present disclosure provide for an UL polling arrangement. For example, in some embodiments, instead of listening to periodic PUCCH resources for uplink scheduling requests, the network node (e.g., gNB) may initiate transmit polling requests to WDs in connected mode (e.g., RRC connected mode) for their UL buffer status. The WDs respond to the polling requests by transmitting polling responses in the specified PUSCH allocation or PUCCH resource. Since resources for the polling response are scheduled, the network node (e.g., gNB) has control on the timing of the polling response; thus, the network node can tune its Rx beam appropriately to ensure successful reception of the polling response. Upon reception of a polling response indicating UL data available at a WD, the network node (e.g., gNB) may schedule UL data transmission for the WD using the conventional UL data transfer procedure.

Some embodiments may advantageously sidestep network node (e.g., gNB) miss-detection of SR transmission due to beam mis-alignment by means of network node (e.g., gNB) initiated UL polling. Some embodiments may be arranged to avoid excessive SR re-transmissions from WDs, hence it is beneficial for the WD power consumption reduction and UL interference reduction. From the network node (e.g., gNB) perspective, some embodiments of the proposed solution may also be beneficial in the sense of more flexible resource scheduling, more efficient spatial sweeping for SR detection and better control of SR latency.

Before describing in detail example embodiments, it is noted that the embodiments reside primarily in combinations of apparatus components and processing steps related to uplink polling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "polling" is used and may indicate the network node checking a status of the WD, such as, the WD's uplink buffer status. In some embodiments, the terms "polling request" and "polling response" may be interchangeable with the terms "request" and "response", respectively.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Although the description herein may be explained in the context of a particular channel, it should be understood that the principles may also be applicable to other channels.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., DCI, UCI, etc.). It may be considered that receiving control signaling comprises demodulating and/or decoding and/or detecting, e.g., blind detection of, one or more messages, in particular a message carried by the control signaling, e.g., based on an assumed set of resources, which may be searched and/or listened for the control information. It may be assumed that both sides of the communication are aware of the configurations, and may determine the set of resources, e.g., based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of a buffer status, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Generally, it may be considered that the network, e.g., a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g., information or payload bits, or total number of bits. The set of resources, and/or the resources of the sets, may pertain to the same carrier and/or bandwidth part, and/or may be located in the same slot, or in neighboring slots.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

The term time resource used herein may correspond to any type of physical resource or radio resource expressed in terms of length of time. Examples of time resources are: symbol, time slot, subframe, radio frame, TTI, interleaving time, etc. As used herein, in some embodiments, the terms "subframe," "slot," subframe/slot" and "time resource" are used interchangeably and are intended to indicate a time resource and/or a time resource number.

A cell may be generally a communication cell, e.g., of a cellular or mobile communication network, provided by a node. A serving cell may be a cell on or via which a network node (the node providing or associated to the cell, e.g., base station or gNB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC connected or RRC idle state, e.g., in case the node and/or user equipment and/or network follow the LTE-standard. One or more carriers (e.g., uplink and/or downlink carrier/s and/or a carrier for both uplink and downlink) may be associated to a cell.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
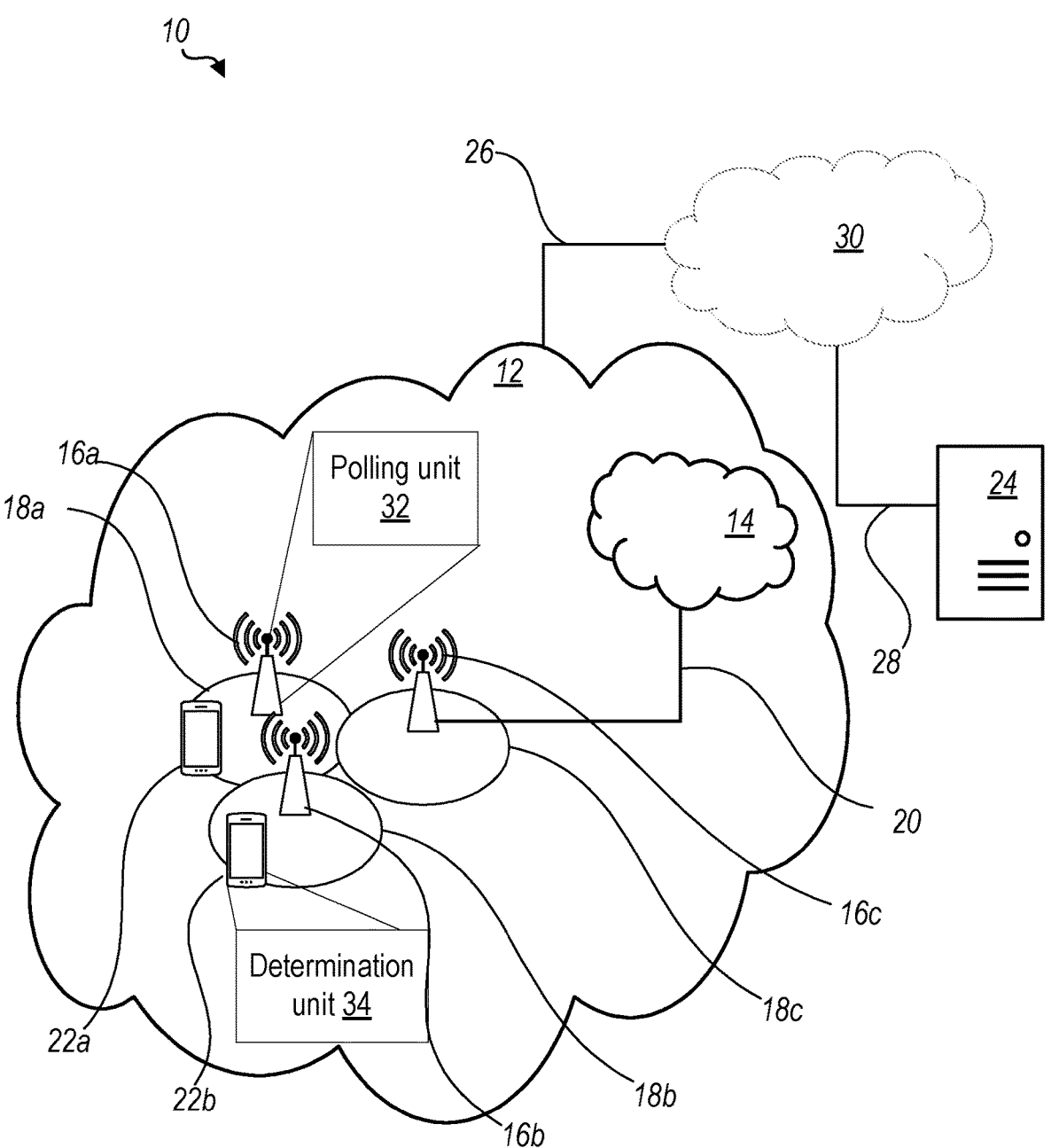
FIG. 3 is a schematic diagram of an example network architecture illustrating a communication system connected via an intermediate network to a host computer according to the principles in the present disclosure.

Some embodiments provide uplink polling for e.g., NR in millimeter wave (mm-Wave) frequency bands. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a polling unit 32 which is configured to transmit a polling request, the polling request indicating a request for the WD's uplink buffer status; and as a result of the polling request, receive a polling response. A wireless device 22 is configured to include a determination unit 34 which is configured to receive a polling request, the polling request indicating a request for the WD's uplink buffer status; and as a result of the polling request, determine the WD's uplink buffer status.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include polling unit 32 configured to perform network node methods discussed herein, such as the methods discussed with reference to FIG. 9 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to perform WD methods discussed herein, such as the methods discussed with reference to FIG. 10 as well as other figures.

Figure 4:
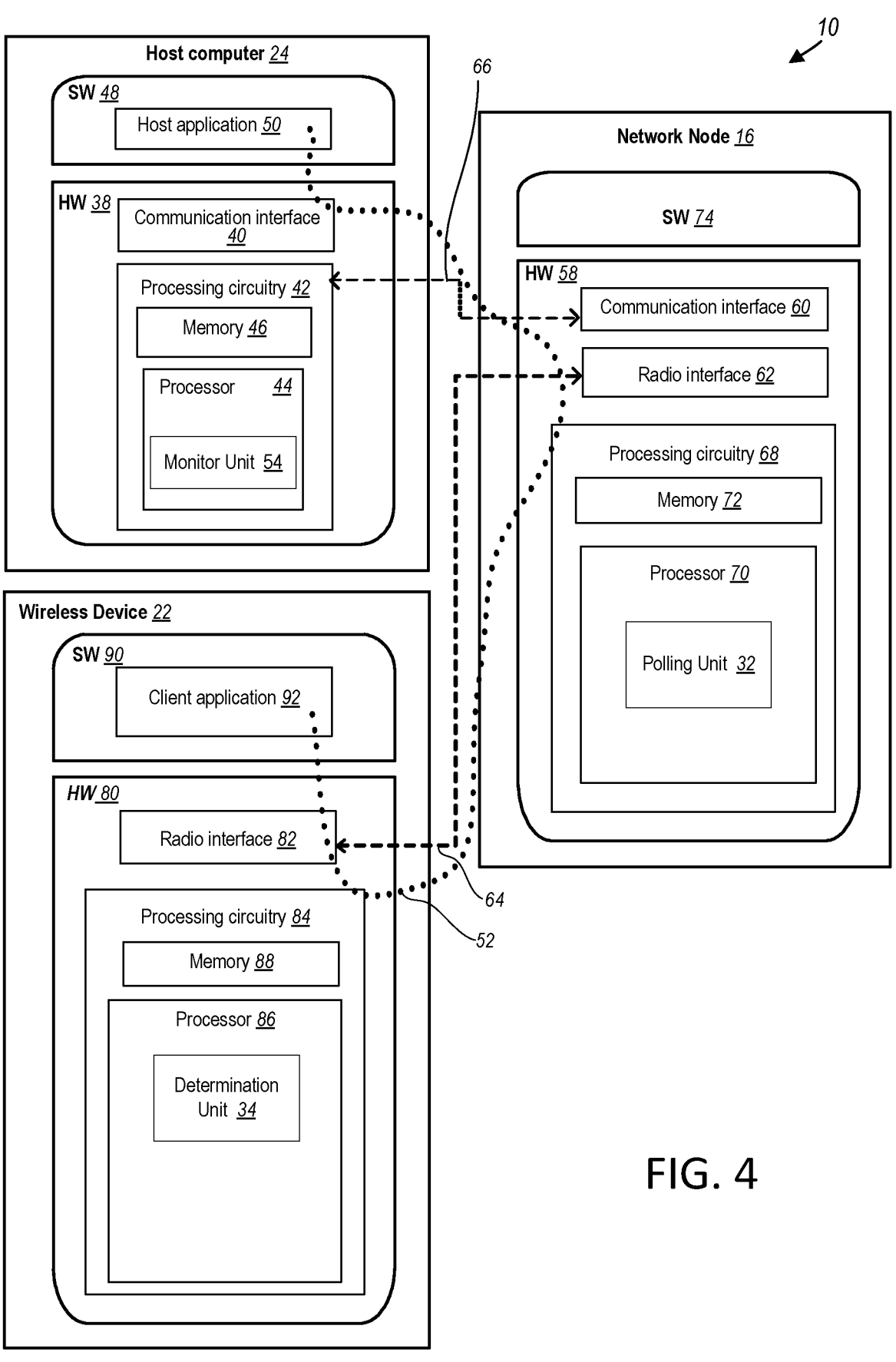
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as polling unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
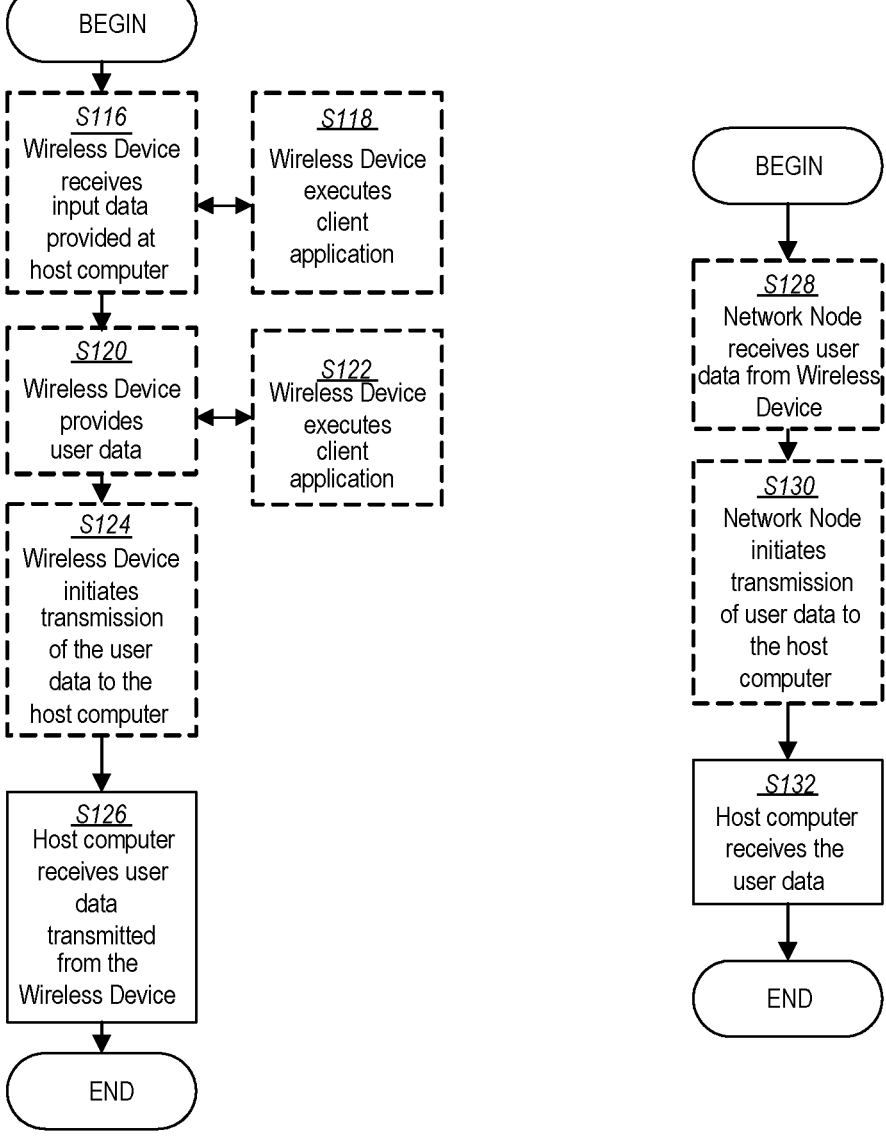
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 9:
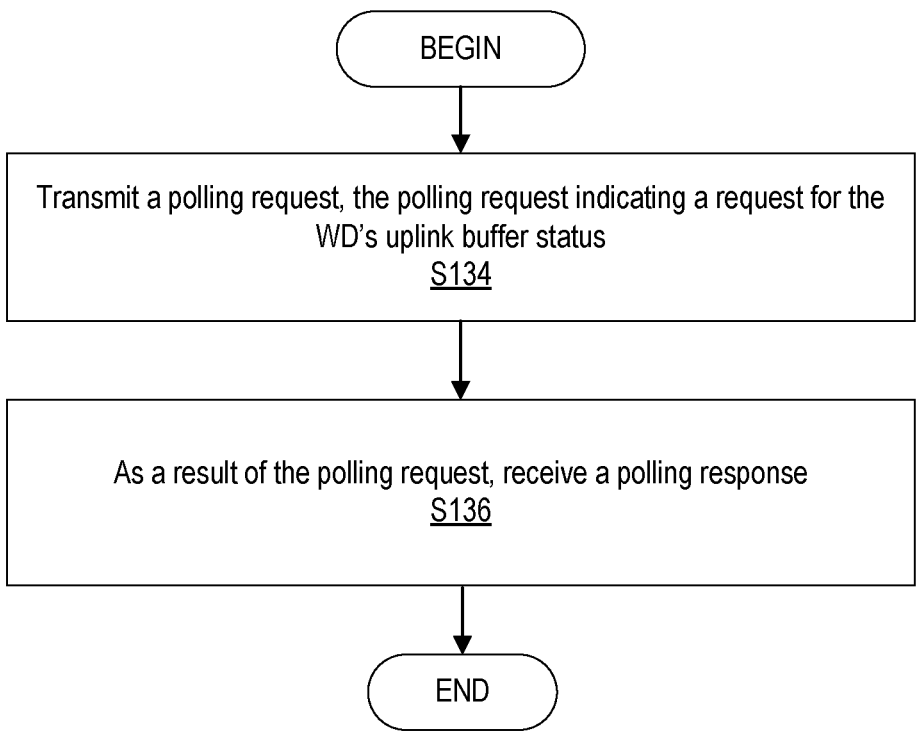
FIG. 9 is a flowchart of an example process in a network node according to some embodiments of the present disclosure.

FIG. 9 is a flowchart of an example process in a network node 16 for polling according to some embodiments of the present disclosure. One or more Blocks and/or functions and/or methods performed by the network node 16 may be performed by one or more elements of network node 16 such as by polling unit 32 in processing circuitry 68, processor 70, communication interface 60, radio interface 62, etc. according to the example method. The example method includes transmitting (Block S134), such as via polling unit 32, processing circuitry 68, processor 70 and/or radio interface 62, a polling request, the polling request indicating a request for the WD's uplink buffer status. The method includes, as a result of the polling request, receiving (Block S136), such as via polling unit 32, processing circuitry 68, processor 70, communication interface 60, radio interface 62, a polling response.

In some embodiments, the polling request indicates a physical uplink channel resource for the WD to transmit the polling response. In some embodiments, the method further includes tuning, processing circuitry 68, processor 70, communication interface 60, radio interface 62, a receiver beam based on the reception of the polling response; and/or receiving, processing circuitry 68, processor 70, communication interface 60, radio interface 62, a scheduling request from the WD 22 using the tuned receiver beam.

Figure 10:
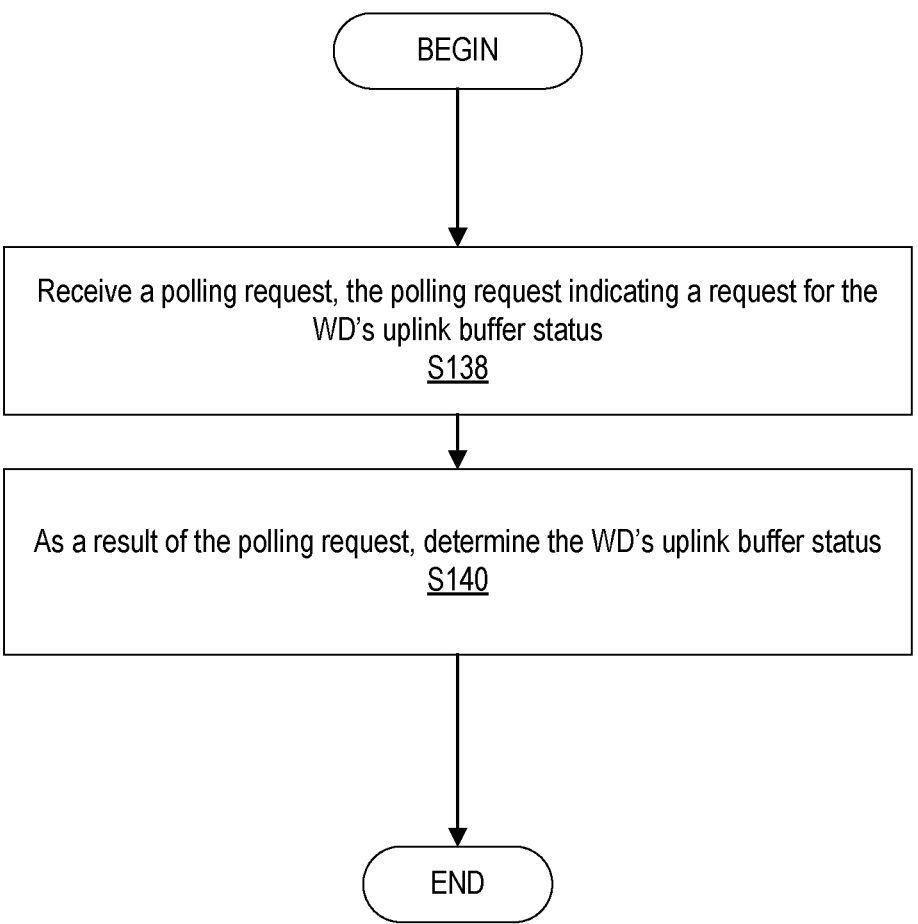
FIG. 10 is a flowchart of an example process in a wireless device according to some embodiments of the present disclosure.

FIG. 10 is a flowchart of an example process in a wireless device 22 determining and/or reporting uplink buffer status according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The process includes receiving (Block S138), such as via determination unit 34, processing circuitry 84, processor 86 and/or radio interface 82, a polling request, the polling request indicating a request for the WD's uplink buffer status. The process includes as a result of the polling request, determining (Block S140), such as via determination unit 34, processing circuitry 84, processor 86 and/or radio interface 82, the WD's 22 uplink buffer status.

In some embodiments, the polling request indicates a physical uplink channel resource for the WD to transmit a polling response. In some embodiments, the process further includes transmitting, such as via determination unit 34, processing circuitry 84, processor 86 and/or radio interface 82, a polling response indicating the WD's uplink buffer status; and/or transmitting, such as via determination unit 34, processing circuitry 84, processor 86 and/or radio interface 82, a scheduling request to the network node 16, the scheduling request being received by the network node 16 based at least in part on the polling response.

Figure 11:
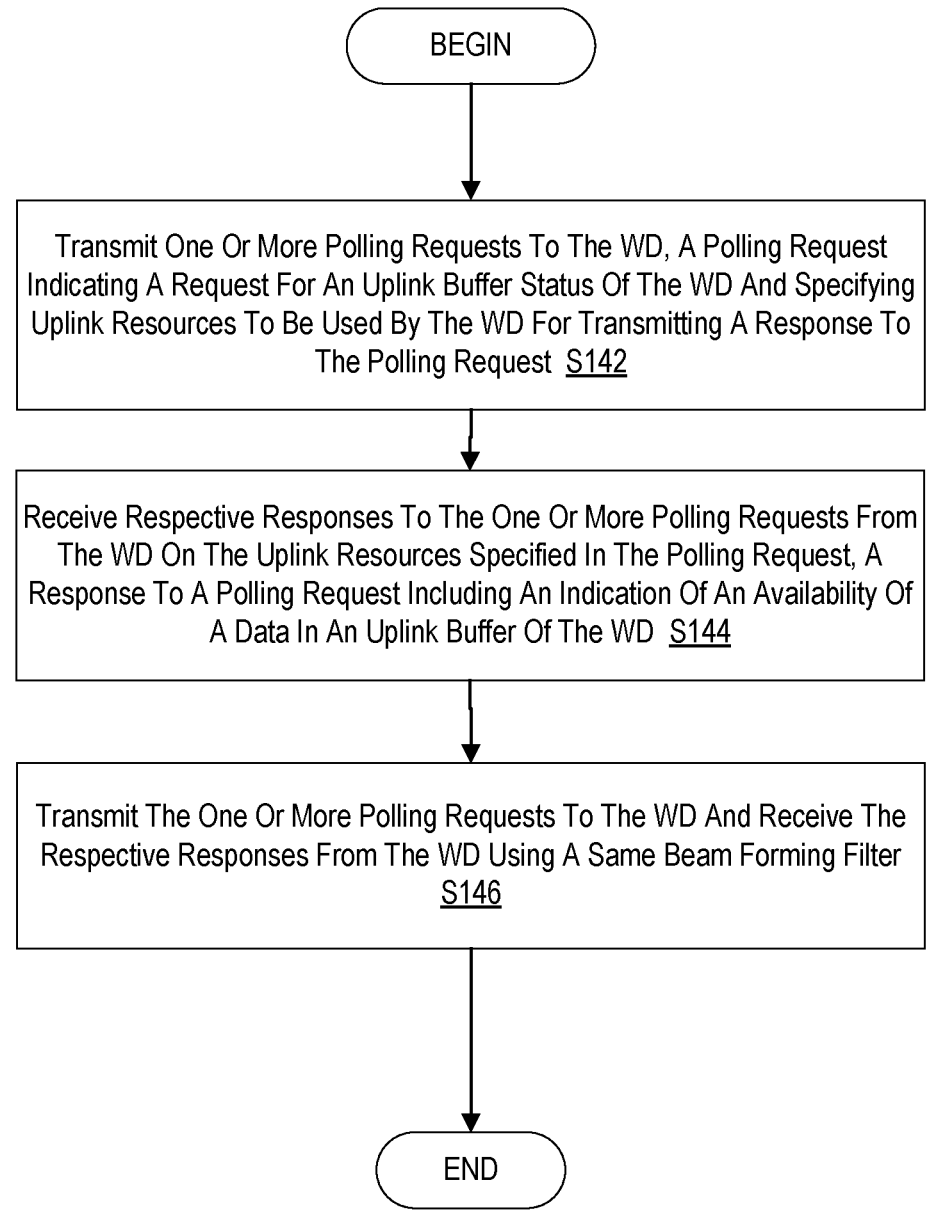
FIG. 11 is a flowchart of another example process in a network node according to principles set forth herein.

FIG. 11 is a flowchart of an example process in a network node according to principles set forth herein. One or more Blocks and/or functions and/or methods performed by the network node 16 may be performed by one or more elements of network node 16 such as by polling unit 32 in processing circuitry 68, processor 70, communication interface 60, radio interface 62, etc. according to the example method. The process includes transmitting one or more polling requests to the WD, a polling request indicating a request for an uplink buffer status of the WD and specifying uplink resources to be used by the WD for transmitting a response to the polling request (Block S142). The process also includes receiving respective responses to the one or more polling requests from the WD on the uplink resources specified in the polling request, a response to a polling request including an indication of an availability of a data in an uplink buffer of the WD (Block S144). The process also includes transmitting the one or more polling requests to the WD and receive the respective responses from the WD using a same beam forming filter (Block S146).

FIG. 12 is a flowchart of an example process in a WD according to principles set forth herein. One or more Blocks and/or functions and/or methods performed by WD 22 may be performed by one or more elements of WD 22 such as by determination unit 34 in processing circuitry 84, processor 86, radio interface 82, etc. The example process includes receiving a polling request from the network node, a polling request indicating a request for an uplink buffer status of the WD 22 and specifying uplink resources to be used by the WD 22 for transmitting a response to the polling request (Block S148). The process also includes transmitting a response to the polling request on a physical uplink control channel, PUCCH, the response including a buffer status report indicating a buffer status of an uplink data buffer of the WD (Block S150).

Having described the general process flow of arrangements of the disclosure and having provided examples of hardware and software arrangements for implementing the processes and functions of the disclosure, the sections below provide details and examples of arrangements for uplink polling for e.g., NR in millimeter wave (mm-Wave) frequency bands, which may be implemented by the network node 16, wireless device 22 and/or host computer 24.

In some embodiments, instead of listening to periodic PUCCH resource for uplink scheduling request, the network node 16 (e.g., gNB) may be configured to initiate transmit polling requests to WDs 22 in connected mode for their UL buffer status. In some embodiments, the WDs 22 may be configured to respond to the polling requests by transmitting polling responses in the specified physical uplink channel resource (e.g., PUSCH allocation or PUCCH resource). Since resources for the polling response are scheduled, the network node 16 (e.g., gNB) may have control on the timing of the polling response; thus, the network node 16 may be able to tune its receiver (Rx) beam appropriately to ensure successful reception of the polling response(s). In some embodiments, upon reception of a polling response indicating UL data available at a WD 22, the network node 16 (e.g., gNB) may schedule UL data transmission for the WD 22 using the conventional UL data transfer procedure.

Figure 13:
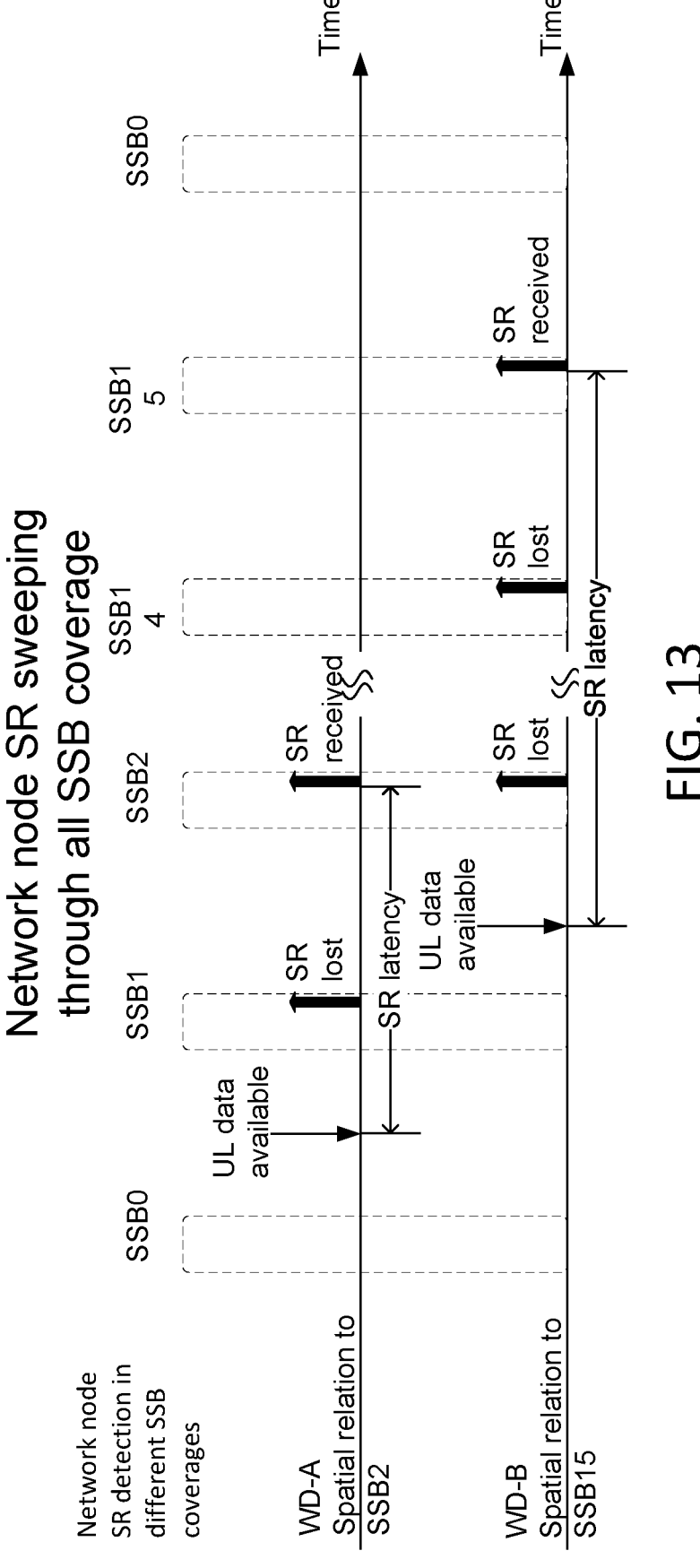
FIG. 13 illustrates an example of SR beam sweeping according to one embodiment of the present disclosure.
Figure 14:
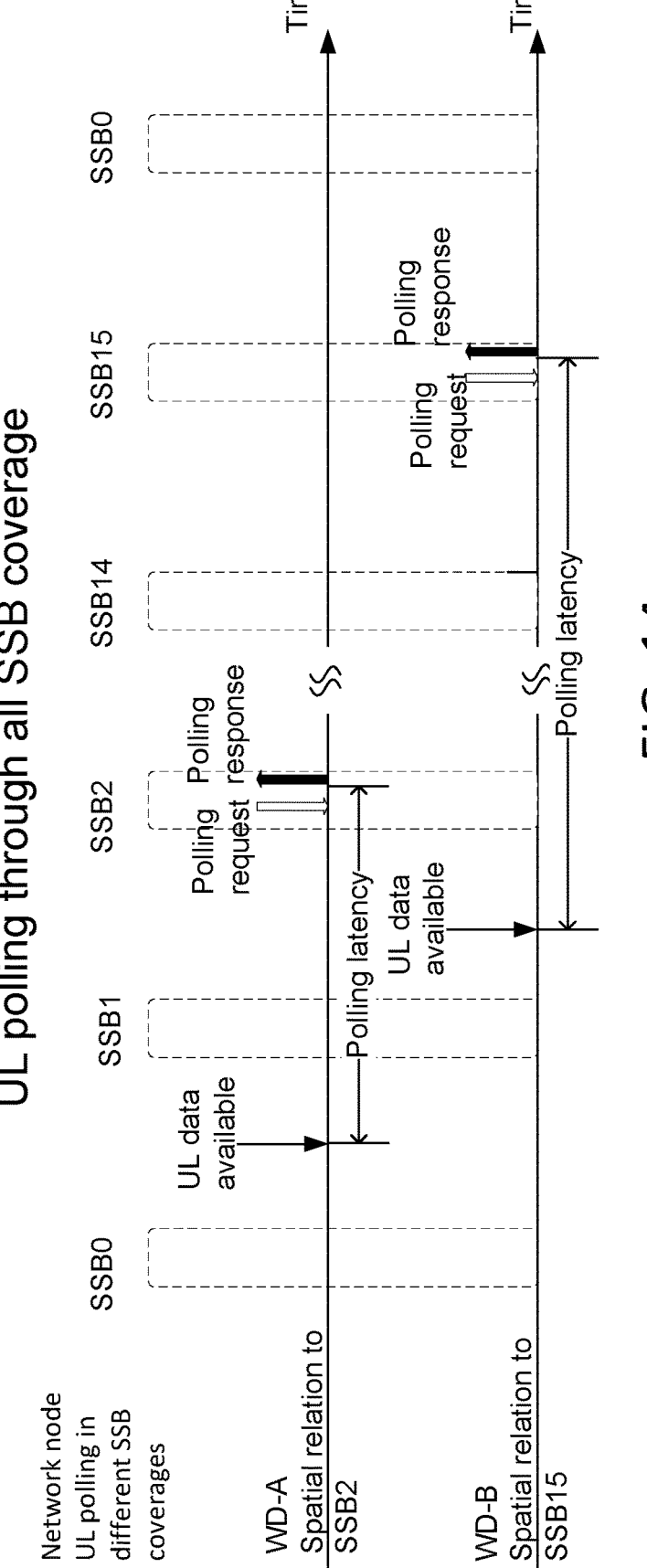
FIG. 14 illustrates an example of UL polling according to one embodiment of the present disclosure.

FIGS. 13 and 14 illustrate a comparison of a SR sweeping mechanism (FIG. 13) with a basic UL polling scenario (FIG. 14) according to one embodiment of the present disclosure. In the example shown in FIGS. 13 and 14, the network node 16 (e.g., gNB) transmits 16 SSBs in 16 beam directions, with WD-A 22 and WD-B 22 located in SSB2 and SSB15 coverage areas, respectively. In FIG. 13, the network node 16 (e.g., gNB) periodically beam-sweeps through all the 16 SSB coverage area for SR detection. WD-A 22 and WD-B 22 trigger SR transmission in the subsequent SR occasions as soon as UL data is delivered from higher layers for UL transmission, until the SR is heard by the network node 16 (e.g., gNB) and UL data grant is received. On the other hand, in FIG. 14, the network node 16 (e.g., gNB) does not configure a periodic SR resource to the WDs 22. Instead, the network node 16 (e.g., gNB) sends polling requests to the WDs 22 in different SSB coverage areas in e.g., a round-robin manner. In this example in FIG. 14, the WDs 22 with UL data in their data buffer only transmit a SR in response to the polling requests from the network node 16.

Embodiment 1: Network Node Triggered Buffer Status Reporting (Polling BSR)

In a non-limiting embodiment, the polling request may include an uplink data grant indicating the frequency and time resource allocation for a PUSCH transmission, with which the current volume of UL data available in the MAC layer of the WD 22 can be reported. The polling request can be sent with one of the existing UL grant downlink control information (DCI) formats (i.e., DCI format 0_0 or 0_1) or a new DCI format. In response to the polling request, a WD 22 with non-empty UL data buffer may report its current volume of UL data to the network node 16 in the PUSCH as specified by the UL grant in the poll request. A WD 22 with an empty UL data buffer may transmit a zero data volume report.

In another variant, a WD 22 with an empty UL data buffer may simply ignore the polling request, for power saving and interference reduction purpose.

This approach can be considered as a variant of the Padding BSR arrangement in 3GPP NR Rel-15. In 3GPP NR Rel-15, a Padding BSR is triggered by the WD 22 receiving an UL resource allocation in which the remaining MAC PDU bits, after mapping of MAC service data units (SDUs), is sufficient to include a BSR MAC-CE. In the UL polling mechanism proposed in this embodiment, the Polling BSR is generated by the WD 22 receiving a polling request, i.e., a UL grant, from the network node 16. Despite different triggering scenarios, the Buffer Status Reporting procedure in NR Rel-15 can be applied to generate a BSR MAC-CE and transmit as the polling response, with the exception that in case the UL data buffer in the WD 22 is empty, the UL grant can be ignored.

To address the application scenarios where UL user data packets are usually small but with low transmission latency requirement, in some embodiments, the network node 16 may allocate a larger UL resource in the polling request, with which WDs 22 can directly transmit UL user data as long as the MAC PDU sizes are sufficient.

Embodiment 2: Aperiodic Scheduling Request

In another non-limiting embodiment, the network node 16 can transmit a polling request to trigger a WD 22 to report its UL data buffer status. The polling request may be included in extensions of the existing DL DCI formats or in a new DCI format. In response to the polling request, the WD 22 with non-empty UL data buffer can report the buffer status in an uplink control information (UCI) message using a pre-configured PUCCH resource. A WD 22 with empty UL data buffer may either transmit a zero data volume indication, or simply ignore the polling request.

This approach can be considered as a sort of aperiodic Scheduling Request. In contrast to the periodic Scheduling Request arrangement in current NR, where a SR transmission is initiated by the WD 22 in a periodic PUCCH transmission occasion, the polling mechanism proposed in this embodiment enables the network node 16 to dynamically trigger SR transmission from the WD 22. Thus, the network node 16 may be able to coordinate SR transmission to achieve more efficient spatial sweeping of SR detection, more flexible resource scheduling and better latency control. For example, the network node 16 can configure each WD 22 with a PUCCH spatial relation given by a particular SSB. Then, if the network node 16 sweeps its receive beam according to the SSB directions for different occasions of the periodic PUCCH resource, the network node 16 can trigger the SR for a particular WD 22 just prior to the PUCCH occasion for which it knows the WDs 22 transmit beam will be aligned with the network node's 16 receive beam. In this way, problems with the existing solutions may be avoided, such as that the WD 22 transmits SRs that will be lost due to the network node 16 not "listening in the correct direction."

In one variant of the embodiment, the polling request is included in extensions of the existing DL DCI formats or a new DCI format in which PUCCH resource for corresponding UCI transmission (for other UCI types such as Hybrid Automatic Repeat reQuest (HARQ) acknowledgement (ACK) or channel station information (CSI) report) is specified. In this scenario the polling response may be expected to be multiplexed and transmitted together with the other UCI type(s).

In another variant of the embodiment, the polling request can include one or more of the following information:

which one of the preconfigured PUCCH-SpatialRelationInfo should be used for the polling response transmission.

In a variant of the embodiment, the above mentioned PUCCH resource indicator, time offset, and/or spatial relation indicator may be either separately or jointly encoded and transmitted in extensions of the existing DL DCI formats or in a new DCI format.

In another variant of the embodiment, the above mentioned PUCCH resource indicator and time offset may be compiled into a SR trigger state. A WD 22 may be configured with a list of SR trigger states by RRC signaling, which includes a number of SR trigger states. The polling request may include an index to a specific SR trigger state in the list, indicating the WD 22 to transmit the polling response in the corresponding PUCCH resource and time occasion. An example aperiodic SR resource configuration is shown in the ASN.1 code and field description table below, as an example.

```
-- ASN1START
-- TAG-SR-APERIODICTRIGGERSTATELIST-START
SR-AperiodicTriggerStateList ::=          SEQUENCE (SIZE (1..maxNrOfSR-AperiodicTriggers))
OF SR-AperiodicTriggerState
SR-AperiodicTriggerState ::=              SEQUENCE {
resource                                  PUCCH-ResourceId
triggeringOffset                          INTEGER(0..7)
    OPTIONAL
pucch-SpatialRelationInfoId                   PUCCH-SpatialRelationInfoId
    OPTIONAL
    ...
}
-- TAG-SR-APERIODICTRIGGERSTATELIST-STOP
-- ASN1STOP
maxNrOfSR-AperiodicTriggers               INTEGER ::= 8 -- Maximum number of triggers
for aperiodic SR transmission
```

| SR-AperiodicTriggerStateList field descriptions |
|---|
| resource |
| ID of the PUCCH resource in which the WD shall send the scheduling request. The actual PUCCH-Resource is configured in PUCCH-Config of the same UL BWP and serving cell as this SchedulingRequestResourceConfig. The network configures a PUCCH-Resource of PUCCH-format0 or PUCCH-format1 (other formats not supported) (see TS 38.213, clause 9.2.4) |
| triggeringOffset |
| Offset X between the slot containing the DCI that triggers an aperiodic SR transmission and the slot in which the SR is transmitted. The value corresponds to the offset in number of slots, i.e., value 0 corresponds to 0 slot (same slot as the one containing the DCI), value 1 corresponds to 1 slot, value 2 corresponds to 2 slot, and so on. |
| pucch-SpatialRelationInfoId |
| ID of a configured spatial relation for PUCCH |

A PUCCH resource indicator pointing to a previously configured PUCCH resource; and/or A time offset indicating the time occasion (OFDM symbol(s)) for the PUCCH transmission, with reference to the polling request transmission time.

Alternatively, the above-mentioned time offset for PUCCH transmission could be statically specified in the specification, or it could be semi-statically configured by system information broadcasting (SIB) or dedicated RRC signaling, to say that the WD 22 is expected to e.g., transmit the polling response in PUCCH after a number, X, of OFDM symbols. In either case, in some embodiments, the time offset may not need to be included in the polling request.

In some embodiments, the polling request may also include a spatial relation indicator, indicating to the WD 22

In a variation of the embodiments, the polling request may be bundled with the MAC-CE message that indicates the PUCCH spatial relation, i.e., piggy-backed with the 3GPP Rel-15 arrangement for indicating PUCCH spatial relations.

In response to polling request, the WD 22 may report its current buffer status in a UCI in the polling response. In one variant of the embodiment, the buffer status UCI is a one-bit indicator, indicating whether the UL data buffer is empty or not empty. If PUCCH formats 0 or 1 are used, the buffer status is indicated either by the presence or absence of the PUCCH transmission (positive SR/negative SR). In other words, the polling response may be transmitted as a Scheduling Request, for which the legacy channel coding, UCI multiplexing and PUCCH transmission mechanism may be reused.

In another variant of the embodiment, a new UCI type may be used for buffer status reporting. The size of the new UCI format may be specified in the specification or semi-statically configured to the WD 22 by broadcasting (e.g., SIB) or dedicated RRC signaling. The new UCI may directly indicate the data volume available for transmission at the WD 22 or may be an index to a data buffer size level table defined in the specification. As a non-limiting example, the buffer size tables defined in subchapter 6.1.3.1 in 3GPP TS 38.321, version (V) 15.8.0 for BSR MAC-CE may be reused for the buffer status report UCI.

In cases where a polling response overlaps in time with any other UCI reporting (such as HARQ-ACK information and CSI) in PUCCH, it may be possible that multiple UCI types are multiplexed in the same PUCCH transmission. The legacy UCI multiplexing rules as specified in NR Rel-15 may be applied in this case, with the BSR UCI type treated with the predefined or configurable priority level (See Sub-chapter 9.2.5 in 3GPP TS 38.213, V16.2.0).

Embodiment 3: Group Polling Via Group Common DCI

In another non-limiting embodiment, the network node 16 can simultaneously poll a group of WDs 22, which most likely may be located in a specific SSB coverage area, via a group common DCI carried in a group common PDCCH (GC-PDCCH).

A new Group Common DCI format may be introduced for this purpose, or new fields to an existing DCI format may be added. To address a group of WDs 22 located in a specific SSB coverage area, the cyclic redundancy check (CRC) of the new GC-DCI format may be scrambled by a radio network temporary identifier (RNTI) with e.g., dependence on the serving cell ID and the SSB index. The spatial relation to be used for polling response transmission may be explicitly indicated by the GC-DCI or implicitly associated with the corresponding SSB transmission.

Additionally, the GC-DCI may include a field to address subset of the WDs 22 specifically within a specific SSB coverage area. As a non-limiting example, the WDs 22 within a specific SSB coverage area may belong into different subgroups. In this case, the GC-DCI may include a bitmap, where each bit corresponds to a subgroup. The network node 16 sets the bit corresponding to a subgroup to indicate polling request for the subgroup. WDs 22 that support group polling may be configured with group polling configuration. The group polling configuration may provide one or more of the following information regarding the polling response transmission:

- A PUSCH resource allocation for Polling BSR transmission or a PUCCH resource indicator pointing to a PUCCH resource for buffer status UCI transmission; and/or
- A time offset indicating the time occasion (OFDM symbol (s)) for the PUSCH/PUCCH transmission, with reference to the polling request transmission time.

In some embodiments, upon detection of the group polling request, the WDs 22 with UL data available in their data buffers may transmit polling responses with the pre-configured PUSCH/PUCCH resource.

Figure 15:
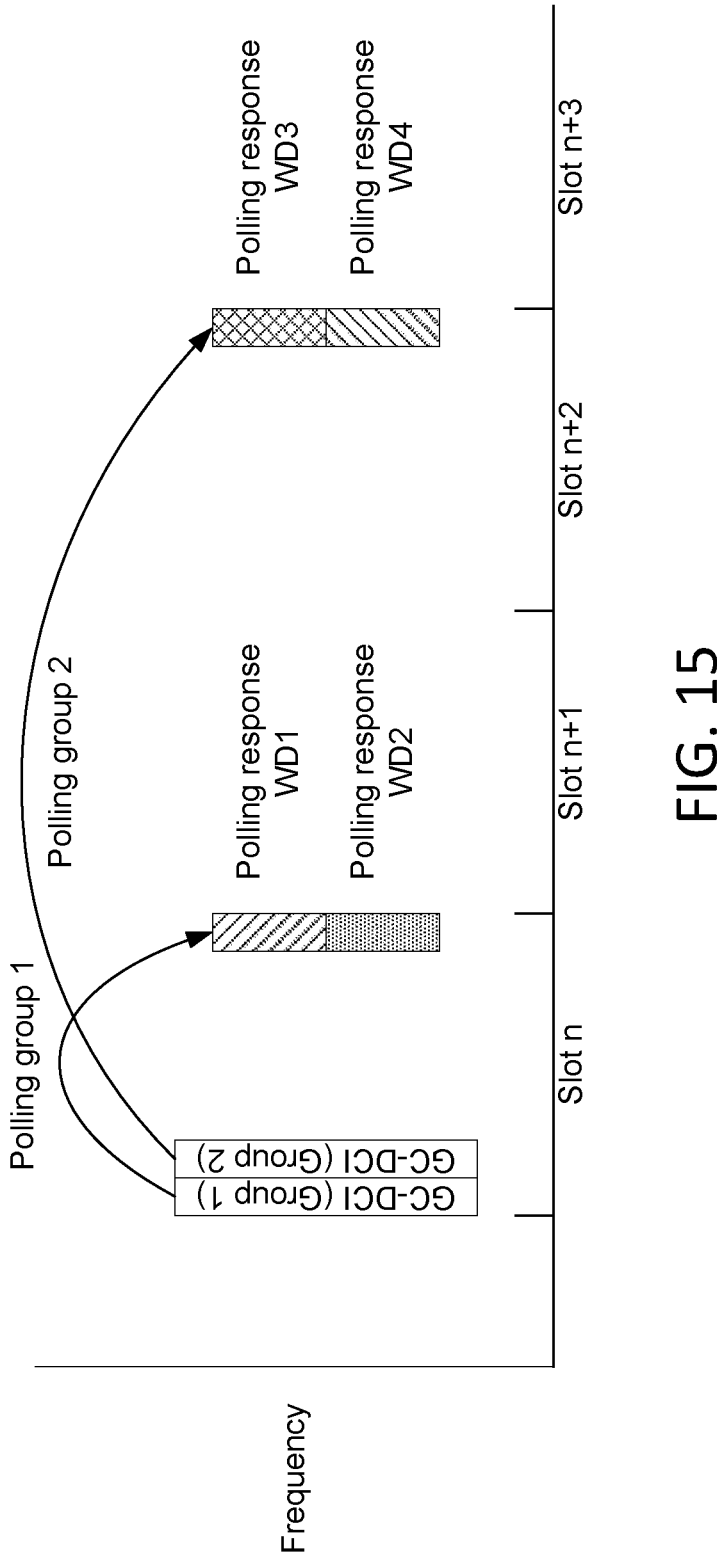
FIG. 15 illustrates a group polling example according to one embodiment of the present disclosure.

FIG. 15 illustrates an example of group polling, where 4 WDs 22 from two polling groups (polling group 1 and polling group 2) respond to their respective group polling requests at different time occasions as per configuration. While FIG. 15 shows that the polling requests are frequency division multiplexed, this is just one example. If the polling response is conveyed by PUCCH, then the different PUCCH resources may be code division multiplexed in which case they would overlap in frequency.

Embodiment 4: Enhancement to Connected Mode DRX

In some embodiments, polling requests may be sent periodically or dynamically. For WDs 22 configured with connected mode discontinuous reception (DRX), the polling requests may be scheduled in coordination with the WD 22 DRX on-duration period, when the WDs 22 wake-up from sleeping mode and actively monitor PDCCH.

In the current DRX procedure as specified in subchapter 5.7 in 3GPP TS 38.321, V15.8.0, if a WD 22 receives a PDCCH that indicates a new DL or UL transmission, the WD 22 may start its drx-InactivityTimer. As long as the timer is still running, the WD 22 may actively monitor PDCCH. In the UL polling mechanism proposed in this disclosure, the WDs 22 that do not have UL data in their data buffer may not respond to polling requests. In one variant of the embodiment, the WDs 22 follow the legacy DRX procedure, i.e., start drx-InactivityTimer upon reception of polling requests, regardless of whether the WDs 22 respond to the polling requests or not. In another variant of the embodiment, to allow WDs 22 to quickly switch back to sleeping mode in this circumstance, an exception may to be introduced to the DRX procedure that WDs 22 may not need to start drx-InactivityTimer upon reception of a polling request if they do not respond to the polling request or they respond with polling response indicating empty UL buffer. This may be beneficial for WD 22 power saving.

Embodiment 5: Coexistence with Periodic SR Transmission

In some embodiments, the WD 22 may be configured by the network node 16 with the UL polling mechanism, with or without the legacy periodic SR transmission being configured at the same time. In case a WD 22 is configured with the UL polling mechanism in combination with the legacy periodic SR transmission, the WD 22 behavior for requesting UL scheduling may be specified as one or more of the following.

In a non-limiting variant of the embodiment, the UL polling configuration is of higher priority and overrides the legacy SR configuration, e.g., the WD 22 may ignore the SR configuration. When there is UL data delivered for UL transmission, the WD 22 may wait for a polling request from the network node 16 and transmit SR UCI or Polling BSR in response to the polling request. A timer, said polling-Timer, may be introduced in the MAC layer to control the maximum waiting time for polling request. An example usage of the timer may be defined according to one or more of the following:

- The timer may be started when new data arrives at previously empty UL data buffer;
- The timer may be restarted when a MAC PDU is transmitted in the uplink while there is still more data in the UL data buffer;
- The timer may be stopped when a MAC PDU is transmitted in the uplink and there is no more data in the UL data buffer; and/or
- When the timer expires, the WD 22 may fallback to random access procedure to request uplink transmission scheduling.

Figure 16:
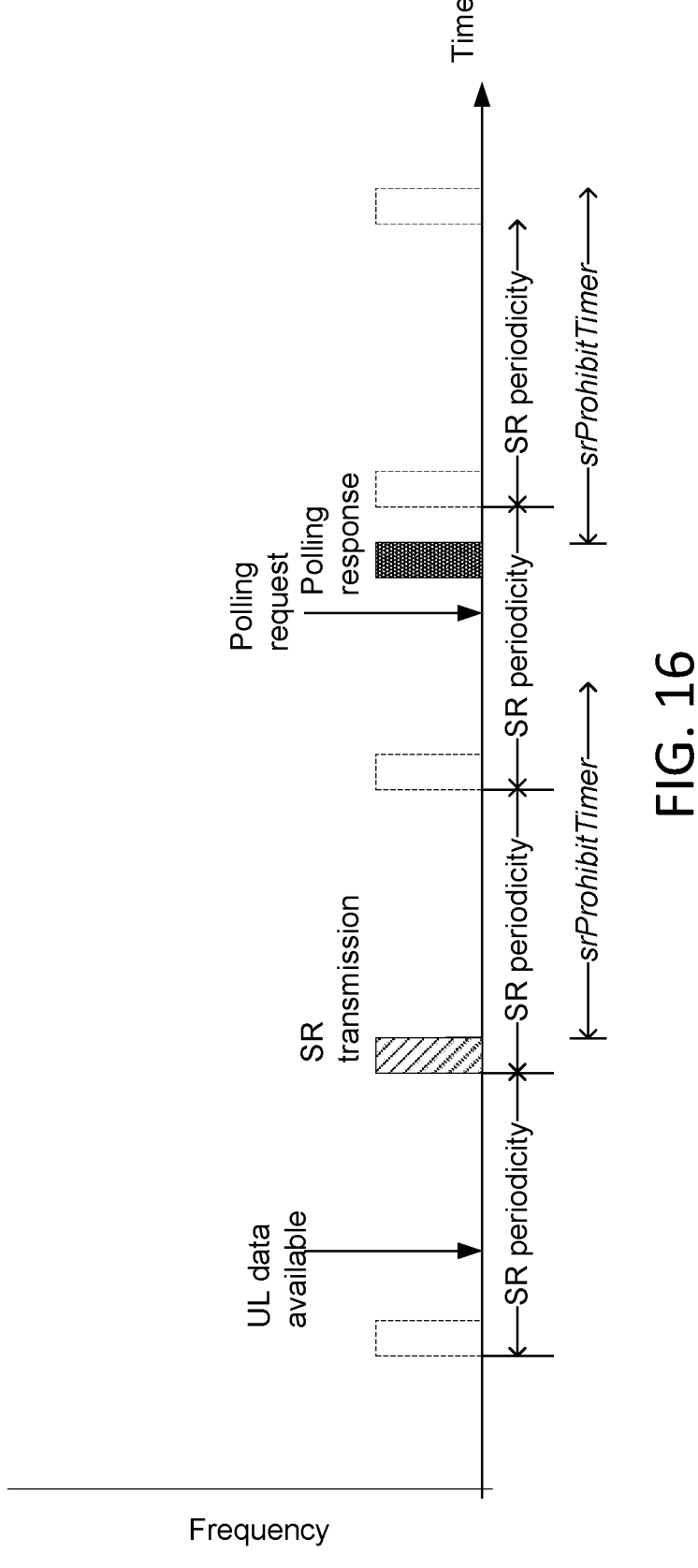
FIG. 16 illustrates an example of UL polling coexistence with periodic SR transmission according to one embodiment of the present disclosure.

In another non-limiting variant of the embodiment, the UL polling configuration may coexist with the periodic SR transmission. The WD 22 may follow the legacy SR procedure to request for uplink transmission scheduling as per SR configuration. On the other hand, when the WD 22 is polled by the network node 16, the WD 22 may also follow the polling procedure to respond to the polling request as described in the preceding embodiments. In one realization of the teaching, the sr-ProhibitTimer, which is currently defined in subchapter 5.4.4 in 3GPP TS 38.321, V15.8.0 with the purpose to control how frequent SR may be transmitted, may be re-started when a poll response is sent. FIG. 16 shows an example of UL polling coexistence with legacy periodic SR transmission.

Embodiment 6: Aperiodic SR Via Slot Format Indicator

In another non-limiting embodiment, the 3GPP Rel-15 slot format indicator (SFI) carried by DCI format 2_0 may be used. The WD 22 is configured with SR resources as per Rel-15. In addition, the WD 22 is not provided static UL/DL configuration or alternatively all symbols corresponding to SR resources are configured as flexible (F). According to Rel-16 specifications if configured to monitor DCI format 2_0 and not provided enableConfiguredUL-r16, the WD 22 will only transmit (configured, i.e., not scheduled) PUCCH, i.e., in this case SR, in symbols signaled as UL (U). Scheduled PUCCH transmissions may not be affected.

In some embodiments, all WDs 22 are then configured with periodic SR resources, but they will only transmit if indicated by DCI format 2_0 as described above. The idea is that PDCCH carrying DCI format 2_0 is transmitted using the same spatial filter (beam) as the network node 16 will use when receiving the SR. This may result in that only WDs 22 that are in the coverage of the beam will hear/receive the PDCCH carrying DCI format 2_0 and thus only those WDs 22 will transmit SR. Because the network node 16 will be listening using that spatial filter (beam) the SR from the transmitting WDs 22 may be received.

In some embodiments, the transmission of PDCCH carrying DCI format 2_0 then acts as the polling trigger/request and the SR acts as the polling response. In a variation of this embodiment, an additional field can be added to DCI 2_0 to indicate a spatial relation ID, e.g., to an SSB. Then, only WDs 22 with configured spatial relations that match the indicated spatial relation in DCI 2_0 respond to the polling request.

According to one aspect, a network node 16 configured to communicate with a wireless device, WD 22 is provided. The network node 16 includes a radio interface 62 configured to: transmit one or more polling requests to the WD 22, a polling request indicating a request for an uplink buffer status of the WD 22 and specifying uplink resources to be used by the WD 22 for transmitting a response to the polling request; and receive respective responses to the one or more polling requests from the WD 22 on the uplink resources specified in the polling request, a response to a polling request including an indication of an availability of a data in an uplink buffer of the WD 22. The network node 16 also includes processing circuitry 68 in communication with the radio interface 62, the processing circuitry 68 configured to transmit the one or more polling requests to the WD and receive the respective responses from the WD using a same beam forming filter.

According to this aspect, in some embodiments, the one or more polling requests are transmitted via the radio interface 62 one of periodically, dynamically and aperiodically. In some embodiments, a polling request is transmitted on a PUSCH and is configured via the processing circuitry 68 to include a physical uplink control channel, PUCCH, resource indicator that points to a previously configured PUCCH resource. In some embodiments, a polling request is configured via the processing circuitry 68 to indicate a time for physical uplink control channel, PUCCH, transmission with reference to a time of transmission of the polling request. In some embodiments, a polling request includes a spatial relation indicator indicating which one of a plurality of a plurality of spatial relations to be used by the WD 22 for transmitting a response to the polling request. In some embodiments, a polling request is bundled with a medium access control, MAC, control element, CE, message that indicates a physical uplink control channel spatial relation. In some embodiments, the one or more polling requests are simultaneously transmitted to a plurality of WDs within the tuned beam, the simultaneously transmitted polling requests being transmitted by a group common downlink control information, DCI, message. In some embodiments, transmitting the one or more polling requests is coordinated with a wake-up time of the WD 22. In some embodiments, a slot format indicator, SFI, is used as a polling request. In some embodiments, a polling request transmitted by the network node 16 is configured to trigger the WD (22) to transmit a response to the polling request on OFDM symbols configured as "flexible". In some embodiments of this aspect, the processing circuitry 68 is further configured to tune a beam on which the network node receives the polling responses to drive a power of the responses to the polling requests to ensure reception of the respective polling responses. In some embodiments, the polling request is transmitted on a physical uplink shared channel, PUSCH.

According to another aspect, a method in a network node 16 configured to communicate with a wireless device, WD 22 is provided. The method includes transmitting one or more polling requests to the WD 22, a polling request indicating a request for an uplink buffer status of the WD 22 and specifying uplink resources to be used by the WD 22 for transmitting a response to the polling request. The method also includes receiving respective responses to the one or more polling requests from the WD 22 on the uplink resources specified in the polling request, a response to a polling request including an indication of an availability of a data in an uplink buffer of the WD 22. The method also includes transmitting (S146) the one or more polling requests to the WD and receive the respective responses from the WD using a same beam forming filter.

According to this aspect, in some embodiments, the one or more polling requests are transmitted one of periodically, dynamically and aperiodically. In some embodiments, a polling request is transmitted on a PUSCH and is configured to include a physical uplink control channel, PUCCH, resource indicator that points to a previously configured PUCCH resource. In some embodiments, a polling request is configured to indicate a time for physical uplink control channel, PUCCH, transmission with reference to a time of transmission of the polling request. In some embodiments, a polling request includes a spatial relation indicator indicating which one of a plurality of a plurality of spatial relations to be used by the WD 22 for transmitting a response to the polling request. In some embodiments, a polling request is bundled with a medium access control, MAC, control element, CE, message that indicates a physical uplink control channel spatial relation. In some embodiments, the one or more polling requests are simultaneously transmitted to a plurality of WDs within the tuned beam, the simultaneously transmitted polling requests being transmitted by a group common downlink control information, DCI, message. In some embodiments, transmitting the one or more polling requests is coordinated with a wake-up time of the WD 22. In some embodiments, a slot format indicator, SFI, is used as a polling request. In some embodiments, a polling request transmitted by the network node 16 is configured to trigger the WD 22 to transmit a response to the polling request on OFDM symbols configured as "flexible". In some embodiments of this aspect, the method further includes tuning a beam on which the network node receives the polling responses to drive a power of the responses to the polling requests to ensure reception of the respective polling responses. In some embodiments, the polling request is transmitted on a physical uplink shared channel, PUSCH.

According to yet another aspect, a WD 22 configured to communicate with a network node 16 is provided. The WD 22 includes an uplink data buffer stored in memory 88 and a radio interface 82. The radio interface 82 is configured to receive a polling request from the network node 16, the polling request indicating a request for an uplink buffer status of the WD 22 and specifying one or more uplink resources to be used by the WD 22 for transmitting a response to the polling request. and transmit a response to the polling request on a specified uplink control channel, PUCCH, the response including a buffer status report indicating a buffer status of the uplink data buffer.

According to this aspect, in some embodiments, transmitting a response is conditioned at least in part on the uplink data buffer being not empty. In some embodiments, the buffer status is indicated by one-bit. In some embodiments, the buffer status report indicates a volume of data in the uplink data buffer. In some embodiments, the WD 22 further includes a timer configured to time a period of waiting for a next polling request. In some embodiments, the timer is stopped when there is no data in the uplink data buffer. In some embodiments of this aspect, the polling request is received on a physical uplink shared channel, PUSCH. In some embodiments, the received polling request is ignored when the WD has an empty uplink data buffer.

According to another aspect, a method in a wireless device, WD 22, configured to communicate with a network node 16 is provided. The method includes receiving via the radio interface 82 a polling request from the network node 16, the polling request indicating a request for an uplink buffer status of the WD 22 and specifying one or more uplink resources to be used by the WD 22 for transmitting a response to the polling request. The method also includes transmitting via the radio interface 82 a response to the polling request on a specified uplink resource, the response including a buffer status report indicating a buffer status of an uplink data buffer of the WD 22.

According to this aspect, in some embodiments, transmitting a response is conditioned at least in part on the uplink data buffer being not empty. In some embodiments, the buffer status is indicated by one-bit. In some embodiments, the buffer status report indicates a volume of data in the uplink data buffer. In some embodiments, a timer is configured via the processing circuitry 84 to time a period of waiting for a next polling request. In some embodiments, the timer is stopped when there is no data in the uplink data buffer. In some embodiments of this aspect, the polling request is received on a physical uplink shared channel, PUSCH. In some embodiments, the received polling request is ignored when the WD has an empty uplink data buffer. Some embodiments include:

Embodiment A1. A network node configured to communicate with a wireless device (WD), the network node configured to, and/or comprising a radio interface and/or comprising processing circuitry configured to:

transmit a polling request, the polling request indicating a request for the WD's uplink buffer status; and as a result of the polling request, receive a polling response.

Embodiment A2. The network node of Embodiment A1, wherein the polling request indicates a physical uplink channel resource for the WD to transmit the polling response.

Embodiment A3. The network node of any one of Embodiments A1 and A2, wherein the network node and/or the radio interface and/or the processing circuitry is configured to:

tune a receiver beam based on the reception of the polling response; and/or receive a scheduling request from the WD using the tuned receiver beam.

Embodiment B1. A method implemented in a network node, the method comprising:

transmitting a polling request; the polling request indicating a request for the WD's uplink buffer status; and as a result of the polling request, receiving a polling response.

Embodiment B2. The method of Embodiment B1, wherein the polling request indicates a physical uplink channel resource for the WD to transmit the polling response.

Embodiment B3. The method of any one of Embodiments B1 and B2, further comprising:

tuning a receiver beam based on the reception of the polling response; and/or receiving a scheduling request from the WD using the tuned receiver beam.

Embodiment C1. A wireless device (WD) configured to communicate with a network node, the WD configured to, and/or comprising a radio interface and/or processing circuitry configured to:

receive a polling request, the polling request indicating a request for the WD's uplink buffer status; and as a result of the polling request, determine the WD's uplink buffer status.

Embodiment C2. The WD of Embodiment C1, wherein the polling request indicates a physical uplink channel resource for the WD to transmit a polling response.

Embodiment C3. The WD of any one of Embodiments C1 and C2, wherein the WD and/or the radio interface and/or the processing circuitry is configured to:

transmit a polling response indicating the WD's uplink buffer status; and/or transmit a scheduling request to the network node, the scheduling request being received by the network node based at least in part on the polling response.

Embodiment D1. A method implemented in a wireless device (WD), the method comprising:

receiving a polling request, the polling request indicating a request for the WD's uplink buffer status; and as a result of the polling request, determining the WD's uplink buffer status.

Embodiment D2. The method of Embodiment D1, wherein the polling request indicates a physical uplink channel resource for the WD to transmit a polling response.

Embodiment D3. The method of any one of Embodiments D1 and D2, further comprising:

transmitting a polling response indicating the WD's uplink buffer status; and/or transmitting a scheduling request to the network node, the scheduling request being received by the network node based at least in part on the polling response.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BSR | Buffer Status Reporting |
| DCI | Downlink Control Information |
| FDM | Frequency Division Multiplexing |
| LCG | Logical Channel Group |
| LTE | Long Term Evolution |
| MAC | Medium Access Control |
| MAC-CE | MAC-Control Element |
| NR | New Radio |
| OFDM | Orthogonal Frequency Division Multiplexing |
| OS | OFDM Symbol |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| RAN | Radio Access Network |
| RB | Resource Block |
| SCS | Sub-Carrier Spacing |
| SR | Scheduling Request |
| SSB | Synchronous Signal and PBCH |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node comprising:
   a radio interface configured to:
      transmit one or more polling requests to the WD, a polling request:
         indicating a request for an uplink buffer status of the WD;

specifying uplink resources to be used by the WD for transmitting a response to the polling request; and including a spatial relation indicator indicating which one of a plurality of spatial relations to be used by the WD for transmitting a response to the polling request; and receive respective responses to the one or more polling requests from the WD on the uplink resources specified in the polling request, a response to a polling request including an indication of an availability of a data in an uplink buffer of the WD; and processing circuitry in communication with the radio interface, the processing circuitry configured to transmit the one or more polling requests to the WD and receive the respective responses from the WD using a same beam forming filter.

2. A wireless device, WD, configured to communicate with a network node, the WD comprising:

an uplink data buffer; and a radio interface configured to:

receive a polling request from the network node, the polling request:

indicating a request for an uplink buffer status of the WD;

specifying one or more uplink resources to be used by the WD for transmitting a response to the polling request; and including a spatial relation indicator indicating which one of a plurality of spatial relations to be used by the WD for transmitting a response to the polling request; and transmit a response to the polling request on a specified uplink resource, the response including a buffer status report indicating a buffer status of the uplink data buffer.

3. A method in a wireless device, WD, configured to communicate with a network node, the method comprising:

receiving a polling request from the network node, the polling request:

indicating a request for an uplink buffer status of the WD:

specifying one or more uplink resources to be used by the WD for transmitting a response to the polling request; and including a spatial relation indicator indicating which one of a plurality of spatial relations to be used by the WD for transmitting a response to the polling request; and transmitting a response to the polling request on a specified uplink resource, the response including a buffer status report indicating a buffer status of an uplink data buffer of the WD.

4. The method of claim 3, wherein transmitting a response is conditioned at least in part on the uplink data buffer being not empty.

5. The method of claim 3, wherein the buffer status is indicated by one-bit.

6. The method of claim 3, wherein the buffer status report indicates a volume of data in the uplink data buffer.

7. The method of claim 3, further comprising a timer configured to time a period of waiting for a next polling request.

8. A method in a network node configured to communicate with a wireless device, WD, the method comprising:

transmitting one or more polling requests to the WD, a polling request:

indicating a request for an uplink buffer status of the WD;

specifying uplink resources to be used by the WD for transmitting a response to the polling request; and including a spatial relation indicator indicating which one of a plurality of spatial relations to be used by the WD for transmitting a response to the polling request; and receiving respective responses to the one or more polling requests from the WD on the uplink resources specified in the polling request, a response to a polling request including an indication of an availability of a data in an uplink buffer of the WD; and transmitting the one or more polling requests to the WD and receiving the respective responses from the WD using a same beam forming filter.

9. The method of claim 8, wherein the one or more polling requests are transmitted one of periodically, dynamically and aperiodically.

10. The method of claim 9, wherein a polling request is configured to include a physical uplink control channel, PUCCH, resource indicator that points to a previously configured PUCCH resource.

11. The method of claim 9, wherein a polling request is configured to indicate a time for physical uplink control channel, PUCCH, transmission with reference to a time of transmission of the polling request.

12. The method of claim 9, wherein a polling request is bundled with a medium access control, MAC, control element, CE, message that indicates a physical uplink control channel spatial relation.

13. The method of claim 9, wherein the one or more polling requests are simultaneously transmitted to a plurality of WDs within the tuned beam, the simultaneously transmitted polling requests being transmitted by a group common downlink control information, DCI, message.

14. The method of claim 8, wherein a polling request is configured to include a physical uplink control channel, PUCCH, resource indicator that points to a previously configured PUCCH resource.

15. The method of claim 8, wherein a polling request is configured to indicate a time for physical uplink control channel, PUCCH, transmission with reference to a time of transmission of the polling request.

16. The method of claim 8, wherein a polling request is bundled with a medium access control, MAC, control element, CE, message that indicates a physical uplink control channel spatial relation.

17. The method of claim 8, wherein the one or more polling requests are simultaneously transmitted to a plurality of WDs within the tuned beam, the simultaneously transmitted polling requests being transmitted by a group common downlink control information, DCI, message.

18. The method of claim 8, wherein transmitting the one or more polling requests is coordinated with a wake-up time of the WD.

19. The method of claim 8, wherein a slot format indicator, SFI, is used as a polling request.

* * * * *